United States Patent
Nakagawa et al.

(10) Patent No.: US 8,546,476 B2
(45) Date of Patent: Oct. 1, 2013

(54) EXOERGIC FILLER COMPOSITION, RESIN COMPOSITION, EXOERGIC GREASE AND EXOERGIC COATING COMPOSITION

(75) Inventors: Ken-Ichi Nakagawa, Sakai (JP); Masahiro Suzuki, Sakai (JP)

(73) Assignee: Sakai Chemical Industry Co., Ltd., Osaka (JP)

( * ) Notice: Subject to any disclaimer, the term of this patent is extended or adjusted under 35 U.S.C. 154(b) by 49 days.

(21) Appl. No.: 12/502,568

(22) Filed: Jul. 14, 2009

(65) Prior Publication Data

US 2011/0011309 A1 Jan. 20, 2011

(51) Int. Cl.
 C08K 3/22 (2006.01)
 C08K 3/20 (2006.01)
 C08K 3/28 (2006.01)
 C09D 5/00 (2006.01)

(52) U.S. Cl.
 USPC ........... 524/432; 524/428; 524/430; 524/433; 524/437

(58) Field of Classification Search
 None
 See application file for complete search history.

(56) References Cited

U.S. PATENT DOCUMENTS

| | | | | |
|---|---|---|---|---|
| 4,265,775 A | * | 5/1981 | Aakalu et al. | 252/573 |
| 5,102,650 A | * | 4/1992 | Hayashi et al. | 423/622 |
| 5,770,216 A | * | 6/1998 | Mitchnick et al. | 428/402 |
| 2003/0008961 A1 | | 1/2003 | Uematsu | |
| 2005/0261140 A1 | | 11/2005 | Yamada et al. | |

FOREIGN PATENT DOCUMENTS

| | | | |
|---|---|---|---|
| EP | 0379746 A2 | | 8/1990 |
| EP | 2423166 A1 | | 2/2012 |
| JP | 7-157664 A | | 6/1995 |
| JP | 8-283456 A | | 10/1996 |
| JP | 11246885 A | | 9/1999 |
| JP | 11-307698 A | | 11/1999 |
| JP | 2000-109373 A | | 4/2000 |
| JP | 2000-114438 A | * | 4/2000 |
| JP | 2002-061653 A | | 2/2002 |
| JP | 2007070492 A | | 3/2007 |
| JP | 2008-094696 A | * | 4/2008 |
| JP | 2008094695 A | | 4/2008 |
| JP | 2009010296 A | * | 1/2009 |

OTHER PUBLICATIONS

Machine translation of JP 2000-114438 A, provided by the JPO website (no date).*
Machine translation of JP 2008-094696 A, provided by the JPO website (no date).*
Machine translation of JP 2009010296 A, provided by the JPO website (no date).*
Supplementary European Search Report issued Aug. 1, 2013 in counterpart EP Application No. 10799700.9.

* cited by examiner

*Primary Examiner* — Michael J Feely
(74) *Attorney, Agent, or Firm* — Novak Druce Connolly Bove + Quigg LLP

(57) ABSTRACT

The present disclosure provides an exoergic filler composition which is able to exert superior exoergic property, and a resin composition, a grease, and a coating composition which having superior exoergic property, respectively, by using the above-mentioned exoergic filler composition. The exoergic filler composition contains 1 to 50 volume % of a needle-shaped zinc oxide having an average long diameter of 0.1 to 10 μm, an average short diameter of 0.025 to 2.5 μm, aspect ratio defined by (average long diameter)/(average short diameter) of 4 or more and specific surface area according to BET method of 50 m$^2$/g or less, and 50 to 99 volume % of other exoergic filler.

8 Claims, No Drawings

12
EXOERGIC FILLER COMPOSITION, RESIN COMPOSITION, EXOERGIC GREASE AND EXOERGIC COATING COMPOSITION

TECHNICAL FIELD

The present disclosure relates to an exoergic filler composition, a resin composition, an exoergic grease and an exoergic coating composition.

BACKGROUND OF THE DISCLOSURE

An exoergic resin composition, an exoergic grease, and an exoergic coating composition are used for electrical products which are required to inhibit built-up heat. These are obtained by mixing an inorganic particle having high heat-conductivity as an exoergic filler with resins, oils and so on. It has been investigated that the exoergic filler which is used for such purpose is converted to a highly heat-conductive composition for high exoergic property.

As the exoergic filler, various high heat-conductive fillers such as alumina, boron nitride, aluminum nitride, zinc oxide, and magnesium oxide are known (PATENT DOCUMENTS 1 and 2). Recently, a method for increasing the filling rate of the exoergic material in a composition by combining various particles having different particle diameter is performed (PATENT DOCUMENTS 3 AND 4).

As mentioned above, it is known to increase the exoergic property by combining two or more kinds of particles having different particle diameter. There is no attempt to increase the exoergic property by combining some particles having unique particle shape.

On the other hand, a needle-shaped zinc oxide having needle shape is known (PATENT DOCUMENT 5). There is no attempt to use the zinc oxide in combination with other exoergic fillers.

PRIOR PATENT DOCUMENT

Patent Document

[PATENT DOCUMENT 1] Japanese Kokai Publication Heill-246885
[PATENT DOCUMENT 2] Japanese Kokai Publication 2005-330426
[PATENT DOCUMENT 3] Japanese Kokai Publication 2002-201483
[PATENT DOCUMENT 4] Japanese Kokai Publication 2007-70492
[PATENT DOCUMENT 5] Japanese Kokai Publication 2008-94695

DISCLOSURE OF INVENTION

Object of the Disclosure

According to the above mentioned state of the art, the object of the present disclosure is to obtain an exoergic filler composition which is able to exert superior exoergic property, and to obtain an exoergic resin composition, an exoergic grease, and an exoergic coating composition which having superior exoergic property, respectively, by using the above-mentioned exoergic filler composition.

Problem to be Solved by the Invention

The present disclosure relates to an exoergic filler composition containing 1 to 50 volume % of a needle-shaped zinc oxide having an average long diameter of 0.1 to 10 μm, an average short diameter of 0.025 to 2.5 μm, aspect ratio defined by (average long diameter)/(average short diameter) of 4 or more and specific surface area according to BET method of 50 m$^2$/g or less, and 50 to 99 volume % of other exoergic filler.

The other exoergic filler is preferably at least one selected from the group consisting of zinc oxide, alumina, boron nitride, aluminum nitride, and magnesium oxide.

The present disclosure relates to a resin composition comprising the exoergic filler composition.

The present disclosure relates to an exoergic grease comprising the exoergic filler composition.

The present disclosure relates to an exoergic coating composition comprising the exoergic filler composition.

Effect of the Invention

The exoergic filler composition of the present disclosure has a remarkable excellent exoergic property, and by using this, an exoergic resin composition, an exoergic grease composition, and an exoergic coating composition having high exoergic property, respectively, can be obtained.

DETAILED DESCRIPTION OF PREFERRED EMBODIMENTS

The present disclosure is described in more detail below. The present inventors have now completed the present disclosure by using zinc oxide having needle shape as a part of an exoergic filler composition. That is, the exoergic filler composition having high exoergic property can be obtained by using needle-shaped zinc oxide having needle shape in combination with other exoergic particles to increase heat-conductivity of the composition as a whole.

The needle-shaped zinc oxide being an essential component in the exoergic filler composition of the present disclosure has an average long diameter of 0.1 to 10 μm, an average short diameter of 0.025 to 2.5 μm, an aspect ratio defined by (average long diameter)/(average short diameter) of 4 or more, and specific surface area according to BET method of 50 m$^2$/g or less. Such needle shape can facilitate the heat diffusion easily because the heat conduction is promoted easily towards the length direction. Furthermore, the needle-shaped zinc oxide can be filled in the space between other filled particles since the zinc oxide has the unique shape, leading to a high filling rate. This has a superior function to increase the exoergic property. Therefore, the needle-shaped zinc oxide can produce an extremely superior exoergic property when used in combination with other exoergic materials.

The needle-shaped zinc oxide preferably has an average long diameter of 0.15 to 5 μm. The needle-shaped zinc oxide preferably has an average short diameter of 0.035 to 1.25 μm. The needle-shaped zinc oxide preferably has an aspect ratio of 4 to 20. The needle-shaped zinc oxide preferably has specific surface area according to BET method of 1 to 40 m$^2$/g.

When the needle-shaped zinc oxide has larger particle diameter out of the mentioned range, it is not preferred because the zinc oxide is difficult to enter the space between other particles and the effect of increasing the exoergic property is decreased. When the needle-shaped zinc oxide has the aspect ratio less than 4, the effect of increasing the exoergic property derived from the needle shape cannot be obtained because its shape cannot be said to be sufficiently needle shaped. Furthermore, when the BET specific surface area exceeds 50 m$^2$/g, it is not preferred because particle size is too small to produce the particle aggregation excessively and the exoergic property derived from the needle shape cannot be produced.

A method for producing the needle-shaped zinc oxide is not particularly restricted, for example, the zinc oxide can be produced by a method comprising adding at the same time and reacting zinc salt aqueous solution and alkali aqueous solution under ultrasonic irradiation. More specifically, for example, the zinc oxide can be produced by adding 300 mL of water at 55° C. into 3 L reaction tank and adding zinc salt aqueous solution 1500 mL (1.48 mol on zinc basis) and alkali aqueous solution 750 mL (2.07 mol on hydroxide ion basis) at the same time for 2 minutes under sufficient stirring with ultrasonic irradiation at frequency 20 kHz using ultrasonic irradiator (US-600T manufactured by NIPPON SEIKI CO., LTD.) to generate a precipitate.

The zinc salt used for producing the needle-shaped zinc oxide is not particularly restricted on condition that it is water-soluble, preferably inorganic acid salts such as chlorides, nitrate salts, and sulfate salts and organic acid salts such as zinc formate and zinc acetate are used. Such zinc salts are usually used as an aqueous solution of 0.01 to 6.0 mol/L concentration. As the alkali used for producing the needle-shaped zinc oxide, usually alkali metal hydroxides are preferably used, especially sodium hydroxide, potassium hydroxide, and lithium hydroxide are preferably used. These alkalis are usually used as an aqueous solution of 0.01 to 18 mol/L concentration.

The needle-shaped zinc oxide can be obtained by adding the zinc salt aqueous solution and the alkali aqueous solution at the same time to a reaction tank while maintaining the mol ratio of hydroxide ion/zinc ion within the range of 1.30 to 1.85 and the pH of the obtained mixture within the range of 6.0 to 8.0, preferably in the range of 6.5 to 7.5, at the reaction temperature of 55° C. or less, preferably 35 to 55° C. More specifically, for example, in the case of a batch system, the needle-shaped zinc oxide can be obtained by storing water in the reaction tank in advance and adding the zinc salt aqueous solution and the alkali aqueous solution in the predetermined proportion at the same time to the reaction tank, under enough stirring to mix the zinc salt aqueous solution and the alkali aqueous solution and contact them with each other. In the continuous system, the adding of the zinc salt aqueous solution and the alkali aqueous solution to the reaction tank at the same time can be performed by following the same procedure.

In general, a reaction of the zinc salt and the alkali proceeds rapidly to substantial completion. To industrially produce the intended needle-shaped zinc oxide efficiently, the total amount of the zinc salt aqueous solution and the alkali aqueous solution respectively may be added to the reaction tank for a certain amount of time or for a short time. Specifically, depending on the concentration, or amount of the zinc salt aqueous solution and the alkali aqueous solution used for the reaction, the time taken for neutralizing 1 L of zinc salt aqueous solution of almost 1 mol/L concentration and 0.75 L of alkali aqueous solution of almost 3.6 mol/L concentration at the same time is usually three minutes or less, for example, two minutes or less.

When the zinc salt aqueous solution and the alkali aqueous solution are added to the reaction tank at the same time in the production of the needle-shaped zinc oxide, the mol ratio of hydroxide ion/zinc ion is preferably 1.30 to 1.85. The mol ratio is less than 1.30, productivity is decreased because redundant zinc ion is excessive. If the mol ratio is over 1.85, the aspect ratio of the obtained needle-shaped zinc oxide tends to become smaller. On the other hand, in the production of the needle-shaped zinc oxide, if the mol ratio of hydroxide ion/zinc ion is over 1.85 when the zinc salt aqueous solution and the alkali aqueous solution are added to the reaction tank at the same time, the needle-shaped zinc oxide may be not obtained.

In the production of the needle-shaped zinc oxide, if the pH of the obtained mixture is over 8.0 when the zinc salt aqueous solution and the alkali aqueous solution are added to the reaction tank at the same time, the zinc oxide having the intended average long diameter, average short diameter, and specific surface area may not be obtained because the obtained needle-shaped zinc oxide tends to become smaller.

In the production of the needle-shaped zinc oxide, if the reaction temperature is over 55° C. when the zinc salt aqueous solution and the alkali aqueous solution are added to the reaction tank at the same time, the needle-shaped zinc oxide having the intended average long diameter, average short diameter, and specific surface area may not be obtained because the needle-shaped obtained zinc oxide tends to size up.

The exoergic filler composition of the present disclosure contains 1 to 50 volume % of the above-mentioned needle-shaped zinc oxide. That is, the exoergic filler composition of the present disclosure contains the above-mentioned needle-shaped zinc oxide and other exoergic fillers. As mentioned above, the needle-shaped zinc oxide has a function to increase the exoergic property especially when used in combination with other exoergic materials. If the content of the needle-shaped zinc oxide is less than 1 volume %, there is a problem that the improvement in exoergic property derived from its shape is not sufficiently achieved. If the content is over 50 volume %, there is a problem that the improvement in exoergic property cannot be expected according to the addition amount because the needle-shaped zinc oxide reaches a saturation point. More preferably, the needle-shaped zinc oxide is added in the proportion of 2 volume % or more, and more preferably in the proportion of 40 volume % or less.

The exoergic filler composition of the present disclosure contains 50 to 99 volume % of other exoergic fillers. The exoergic materials are not particularly restricted, but contain metallic oxides such as zinc oxide, magnesium oxide, titanium oxide, and aluminum oxide, aluminum nitride, boron nitride, silicon carbide, silicon nitride, titanium nitride, metallic silicon, and diamond. As the other exoergic filler, publicly available material can be used.

As the other exoergic fillers used in combination with the needle-shaped zinc oxide, highly heat-conductive fillers such as alumina, aluminum nitride, boron nitride, zinc oxide, and magnesium oxide are extremely preferred to be used. When the needle-shaped zinc oxide is used in combination with other exoergic fillers, the other exoergic filler is not limited to one kind, but contains the same kind of substances having different particle size, or different two or more kinds of substances having different particle size.

When two kinds of exoergic fillers are used in combination as the other exoergic fillers, a composition obtained by mixing a mixed exoergic filler and the needle-shaped zinc oxide in the volume ratio of 5:5 to 99:1 may be used, wherein the mixed exoergic filler is obtained by selecting an exoergic filler (a) having primary particle diameter, determined by the measuring method using images taken by the Electron Microscope Photo Instrument as mentioned later, of 1 to 15 μm and an exoergic filler (b) of 0.05 to 4 μm, so that the particle diameter ratio ((a)/(b)) is remained within the range of $4 \leq (a)/(b) \leq 20$, and mixing so that the volume ratio ((a):(b)) is remained within the range of 5:5 to 9:1. In the case that such proportion is selected, the effect of the present disclosure can be extremely suitably obtained. The shape of the other exoergic filler is not particularly restricted, but contains spherical shape, grain shape, cube shape, bar shape, hexagonal plate shape, scale-like shape and so on.

The exoergic filler composition of the present disclosure is usually used in the fields such as exoergic resin compositions, exoergic greases and exoergic coating compositions. Many publications concerning such applications are known, the exoergic filler composition of the present disclosure is used in such known applications as exoergic resin compositions, exoergic greases and exoergic coating compositions. The exoergic resin composition, exoergic grease and exoergic coating composition are one aspect of the present disclosure, respectively.

The exoergic filler composition of the present disclosure can be used as a resin composition obtained by mixing with a resin. Such resin composition is one aspect of the present disclosure. In this case, the resin may be a thermoplastic resin or a thermosetting resin and includes epoxy resins, phenol resins, polyphenylene sulfide resins (PPS), polyester resins, polyamides, polyimides, polystyrenes, polyethylenes, polypropylenes, polyvinyl chlorides, polyvinylidene chlorides, fluorine resins, polymethyl methacrylate, ethylene/ethyl acrylate copolymer resin (EEA), polycarbonates, polyurethanes, polyacetals, polyphenylene ethers, polyether imides, acrylic nitrile-butadiene-styrene copolymer resin (ABS), liquid crystal resins (LCP), silicone resins, acrylic resins and other resins.

The resin composition of the present disclosure may be a resin composition for thermal molding obtained by kneading a thermoplastic resin and the exoergic filler composition in melting condition: a resin composition obtained by kneading a thermosetting resin and the exoergic filler composition following thermosetting: or other resin composition.

The addition amount of the exoergic filler composition in the resin composition of the present disclosure can be arbitrarily determined according to the intended performance of the resin composition such as thermal conductivity, hardness and so on. In order to express the exoergic property of the exoergic filler composition sufficiently, the addition amount is preferably 5 to 90 volume % relative to the total solid matter of the resin composition. The addition amount can be adjusted according to the needed level of exoergic property. For the application required better exoergic property, the addition amount is more preferably 30 volume % or more, and still more preferably 50 volume % or more.

In the resin composition of the present disclosure, the resin component may be selected in accordance to the use. For example, when the resin composition is placed between the heat source and the exoergic plate to make them stick together, resins having high adhesion property and low hardness such as silicone resins and acrylic resins can be selected.

When the resin composition of the present disclosure is a resin composition for thermal molding, the resin composition may be produced by the method comprising melt-kneading a thermoplastic resin and the exoergic filler composition using a double-screw extruder, for example, to pelletize the resin composition and then, molding to the desired shape by the arbitrary molding method such as injection molding and so on.

When the resin composition of the present disclosure is the resin composition obtained by kneading a thermosetting resin and the exoergic filler composition following thermosetting, it is preferably molded by pressure molding. Such method for producing the resin composition is not particularly limited, but includes the method comprising molding the resin composition by transfer molding.

The applications of the resin composition of the present disclosure include exoergic parts of electronic components, thermal-conductive bulking agents, and insulating bulking agents for temperature measurement. For example, the resin composition of the present disclosure can be used in order to transfer the heat from the exothermic electronic components, such as a MPU, power transistor, transformer to the exoergic components such as exoergic fins and exoergic fans, and can be placed between the exothermic electronic components and exoergic components. This will allow good heat transfer between the exothermic electronic components and the exoergic components and will provide for a decrease in malfunction of the exothermic electronic components for a long term. Furthermore, the resin composition of the present disclosure can be suitably used for connecting a heat pipe and a heat sink, or connecting a module incorporated into various exothermic bodies and a heat sink.

The exoergic filler composition may be used as an exoergic grease obtained by mixing with a base oil which contains a mineral oil or a synthetic oil. This exoergic grease is one aspect of the present disclosure.

The addition amount of the exoergic filler composition in the exoergic grease of the present disclosure may be determined according to the intended degree of thermal conductivity. In order to express the exoergic property of the exoergic filler composition sufficiently, the addition amount of the exoergic filler composition is preferably 10 to 90 volume % relative to the total amount of the exoergic grease. The addition amount can be adjusted according to the needed level of exoergic property. For the application required better exoergic property, the addition amount is more preferably 30 volume % or more, and still more preferably 50 volume % or more.

As the base oil, one or more kinds of oil materials selected from the group consisting of mineral oils, synthesis oils, silicone oils, fluorinated hydrocarbon oils and the like can be used. The synthesis oil is preferably a hydrocarbon oil. As the synthesis oil, there may be mentioned α-olefins, diesters, polyol esters, trimellitic esters, polyphenyl ethers, alkylphenyl ethers and so on.

The exoergic grease of the present disclosure may contain a surfactant according to need. The surfactant is preferably a nonionic surfactant. By adding the nonionic surfactant, thermal conductivity can be improved and consistency of the exoergic grease can be controlled moderately.

As the nonionic surfactant, there may be mentioned polyoxyethylene alkyl ethers, polyoxyethylene alkyl phenyl ethers, polyoxyethylene alkyl naphthylene ethers, polyoxyethylene castor oil, polyoxyethylene hydrogenated castor oil, polyoxyethylene alkylamides, polyoxyethylene-polyoxypropylene glycols, polyoxyethylene-polyoxypropylene glycol ethylene diamines, decaglycerin fatty acid esters, polyoxyethylene fatty acid monoesters, polyoxyethylene fatty acid diesters, polyoxyethylene propylene glycol fatty acid esters, polyoxyethylene sorbitan fatty acid monoesters, polyoxyethylene sorbitan fatty acid triesters, ethylene glycol fatty acid monoesters, diethylene glycol fatty acid monoesters, propylene glycol fatty acid monoesters, glycerin fatty acid monoesters, pentaerythritol fatty acid monoesters, sorbitan fatty acid monoesters, sorbitan fatty acid sesquiesters, and sorbitan fatty acid triesters.

The effect of adding the nonionic surfactant depends on the kind of the exoergic filler, addition amount, and HLB which is the term showing the balance between hydrophilicity and lipophilicity (hydrophile-lipophile balance). Liquid surfactants with HLB of not more than 9 are preferred because good consistency is obtained at room temperature, in the practice of the present disclosure. Anionic surfactants, cationic surfactants and ampholytic surfactants may be used in the application such as highly exoergic grease where the decrease of electrical insulation and electrical resistance are not emphasized.

The exoergic grease of the present disclosure can be produced by mixing the above mentioned components using a mixing apparatus such as a dow mixer (kneader), gate mixer, planetary mixer and so on.

The exoergic grease of the present disclosure may be applied to the exothermic body or the exoergic body. As the exothermic body, there may be mentioned, for example, exothermic electronic components such as general electrical source; power transistor for electrical source, power module, thermistor, thermo couple, temperature sensor and other electronic apparatus: integrated circuit element such as LSI and CPU. As the exoergic body, there may be mentioned, for example, exoergic components such as heat spreader, heat sink; heat pipe, and exoergic plate. The application can be performed by the screen print method. The screen print method may be performed using metal mask or screen mesh. By applying the composition of the present disclosure between the exothermic body and the exoergic body, it is able to effectively remove heat from the exothermic body because heat transfer from the exothermic body to the exoergic body is performed efficiently.

The exoergic filler can be used as a coating composition obtained by dispersing the filler in a resin solution or dispersion liquid. This exoergic coating composition is one aspect of the present disclosure. In this case, the resin contained in the composition may be a hardenable one or a non-hardenable one. The resin may include the exemplified resins which can be used in the resin composition mentioned above. The coating composition may be a solvent type one containing organic solvents or an aqueous type one containing a resin dissolved or dispersed in water.

The method for producing the coating composition is not particularly restricted but the coating composition can be produced by mixing and dispersing the necessary materials and solvents using a disper or beads mill.

The addition amount of exoergic filler composition in the exoergic coating composition of the present disclosure may be decided according to the intended degree of thermal conductivity. In order to express the exoergic property of the exoergic filler composition sufficiently, the addition amount is preferably 10 to 90 volume % relative to the total amount of the coating composition. The addition amount can be adjusted according to the needed level of exoergic property. For the application required better exoergic property, the addition amount is more preferably 30 volume % or more, and still more preferably 50 volume % or more.

EXAMPLE

Hereinafter, the present disclosure will be described in more detail by way of examples, but the present disclosure is not limited to these examples.

Hereinafter, the measuring methods of the long diameter, the short diameter and the aspect ratio are described in more detail below.
(Measuring Method of Long Diameter, Short Diameter, and Aspect Ratio)

Photographs of each zinc oxide sample were taken at five locations by using Transmission Electron Microscopy (JEM-100SX manufactured by JEOL Ltd.) at 80000-fold magnification to obtain five photographs with image parts of 12 cm narrow side and 16.5 cm long side. In each photograph, one line was drawn parallel to the narrow side from the middle point of the long side, another line parallel to the long side from the middle point of the narrow side. Two diagonal lines were drawn, and short diameter and long diameter of the particle overlapped with these four lines were measured by using vernier caliper. When various lines were overlapping at the area of the same particle, the measurement was not performed, redundantly. In all five photographs, 100 to 150 particles were measured and the averages of the measured short diameter and long diameter, respectively, were determined as the average short diameter and the average long diameter of the zinc oxide sample. The value obtained by dividing the average long diameter by the average short diameter was determined as the aspect ratio of the zinc oxide. In this magnification ratio, 0.125 μm was indicated as 1 cm in the photograph. The diameter was measured to 0.01 cm and the digit of 0.00001 μm was rounded off to average the measurement value. As for the aspect ratio, the significant values were limited to two digits and the third digit was rounded off.
(The SSA diameter was measured by using GEMINI 12360 manufactured by Micromeritics. As X-ray diffractometer, RAD IIC manufactured by Rigaku Corporation was used.)
(Measuring Method of Particle Diameter of Zinc Oxide Particles Used in Comparative Examples)

As for the zinc oxide particle used in Comparative Example, the primary particle diameter thereof was determined from SEM photographs by the following method. Photographs of each zinc oxide particle were taken at five locations by using Scanning Electron Microscope (JSM 840 F manufactured by JEOL Ltd.) at 50000-fold magnification to obtain five photographs with image parts of 9 cm narrow side and 12 cm long side. In each photograph, one line was drawn parallel to the narrow side from the middle point of the long side, another line parallel to the long side from the middle point of the narrow side. Two diagonal lines were drawn, and short diameter and long diameter of the particle overlapped with these four lines were measured by using vernier caliper. The average of these values was determined as average primary particle diameter of the image and the average of all five images was determined as SEM-observed primary particle diameter (SEM diameter). The measured value was measured to 0.01 μm and rounded to two decimal places to be averaged. The results were shown in Table 1. The particle diameters (SSA particle diameter) determined from BET specific surface area and absolute specific gravity were shown in Table 1, too. In the measurement of particle diameter of FINEX-30, the particle diameter was measured to 0.001 μm and rounded to three decimal places to be averaged.

TABLE 1

| | SEM particle diametyer (μm) | Shape of particle | SSA ($m^2/g$) | SSA particle diameter (μm) |
|---|---|---|---|---|
| FINEX-30 | 0.036 | grain shape | 30 | 0.035 |
| Zinc oxide JIS 1 | 0.32 | grain shape | 3.5 | 0.3 |

(Measuring Method of Primary Particle Diameter of Magnesium Oxide)

The particle diameter (SSA particle diameter) was determined from BET specific surface area and absolute specific gravity. Photographs of each magnesium oxide particle were taken at five locations by using Scanning Electron Microscope (JSM 840 F manufactured by JEOL Ltd.) at 2000-fold magnification when the SSA particle diameter was almost 10

μm, at 5000-fold magnification when the SSA particle diameter was almost 1 to 2 μm, and at 50000-fold magnification when the SSA particle diameter was almost 0.1 μm, respectively, to obtain five photographs with image parts of 9 cm narrow side and 12 cm long side. In each photograph, one line was drawn parallel to the narrow side from the middle point of the long side, another line parallel to the long side from the middle point of the narrow side. Two diagonal lines were drawn, and short diameter and long diameter of the particle overlapped with these four lines were measured by using vernier caliper. The average of these values was determined as SEM-observed primary particle diameter (SEM diameter) of each image.

Preparation Example 1

Preparation of Needle-Shaped Zinc Oxide Particle a

Water (300 mL) at 55° C. was charged into a 3 L reaction tank, and zinc chloride aqueous solution of 135 g/L concentration 1500 mL (1.48 mol on zinc chloride basis) and sodium hydroxide aqueous solution of 110 g/L concentration 750 mL (2.07 mol on sodium hydroxide basis) are added at the same time for two minutes under sufficient stirring, irradiating ultrasonic at frequency 20 kHz by use of ultrasonic irradiator (US-600T manufactured by Nippon Seiki Co., Ltd.) to produce a precipitate.

The obtained precipitate was filtered, washed with water and dried to obtain a white powder. This powder was subjected to X-ray diffraction to identify the powder as zinc oxide. The specific surface area of this zinc oxide was 4 m$^2$/g according to nitrogen adsorption method (Hereinafter, the specific surface area was measured in the same way). The average short diameter was 0.2427 μm, the average long diameter 0.9894 μm, and the aspect ratio 4.1.

Preparation Example 2

Preparation of Needle-Shaped Zinc Oxide Particle b

White powder was obtained by following the same procedure as that of Preparation Example 1 except that the sodium hydroxide aqueous solution of 142 g/L concentration 750 mL (2.66 mol on sodium hydroxide basis) was used. This powder was subjected to X-ray diffraction to identify the powder as zinc oxide. The specific surface area of this zinc oxide was 40 m$^2$/g. The average short diameter was 0.0295 μm, the average long diameter 0.1534 μm, and the aspect ratio 5.2.

Examples 1 to 6

Resin molded articles were prepared by mixing EEA resin (Rexpearl A-1150 manufactured by Japan Polyethylene Corporation), the needle-shaped zinc oxide particle of Preparation Example 1 or 2 and various exoergic fillers of Table 2 at 160° C. as shown in Table 2 and then pressure molding. These were molded to be molded articles with 50 mm×2 mm (diameter×thickness). Thermal conductivity of the molded articles were measured. In addition, thermal conductivity was measured at 25° C. according to the method with heat flow meter. The results were shown in Table 2.

Comparative Example 1

Thermal conductivity was measured by following the same procedure as that of Example 1 except that the exoergic filler was not added. The result was shown in Table 2.

Comparative Example 2

A molded article was obtained by using the same composition as that of Example 4 except that the needle-shaped zinc oxide particle b was replaced with fine particle zinc oxide FINEX-30 manufactured by Sakai Chemical Industry in the proportion shown in Table 2. Thermal conductivity was measured by following the same procedure as that of Example 1. The result was shown in Table 2.

Comparative Examples 3 and 4

Thermal conductivity was measured by following the same procedure as that of Example 1 except that the exoergic filler was replaced with alumina 20 μm only or the combination of alumina 10 μm and 0.8 μm. The results were shown in Table 2.

TABLE 2

| | | | Compar. Ex. | Example | | | | | | Comparative Example | | |
|---|---|---|---|---|---|---|---|---|---|---|---|---|
| | | | 1 | 1 | 2 | 3 | 4 | 5 | 6 | 2 | 3 | 4 |
| Addition amount (weight part) | EEA resin | | 100 | 10 | 10 | 10 | 10 | 10 | 10 | 10 | 12 | 10 |
| | Needle-shaped zinc oxide particle | a | | | | 10 | | 10 | 10 | | | |
| | | b | | 12.4 | 3.1 | | 10 | | | | | |
| | Magnesium oxide manufactured by Sakai Chemical Industry (SEM diameter 10 μm) | | | 37.2 | | | 41.7 | | | | | |
| | Magnesium oxide manufactured by Sakai Chemical Industry (SEM diameter 2 μm) | | | | | | | | | | | |
| | Magnesium oxide manufactured by Sakai Chemical Industry (SEM diameter 1 μm) | | | 14.9 | 41.2 | 11.9 | | 11.9 | | | | |
| | Magnesium oxide manufactured by Sakai Chemical Industry (SEM diameter 0.1 μm) | | | | | 16.5 | | | | | | |

TABLE 2-continued

| | Compar. Ex. 1 | Example 1 | Example 2 | Example 3 | Example 4 | Example 5 | Example 6 | Comparative Example 2 | Comparative Example 3 | Comparative Example 4 |
|---|---|---|---|---|---|---|---|---|---|---|
| Large particle zinc oxide manufactured by Sakai Chemical Industry LPZINC-11 | | | | | 70 | 70 | | 70 | | |
| Large particle zinc oxide manufactured by Sakai Chemical Industry LPZINC-2 | | | | | 20 | | | 20 | | |
| Fine particle zinc oxide manufactured by Sakai Chemical Industry FINEX-30 | | | | | | | | 10 | | |
| Alumina 20 µm | | | | | | | | | 68.5 | |
| Alumina 10 µm | | | | | | | 47.9 | | | 47.9 |
| Alumina 0.8 µm | | | | | | | 13.7 | | | 20.5 |
| Filler (volume %) | 0 | 62.9 | 62.9 | 62.9 | 62.9 | 62.9 | 62.9 | 62.9 | 58.6 | 62.9 |
| Thermal conductivity (W/m · K) | 0.3 | 4.2 | 4 | 4.4 | 4.1 | 4.3 | 3.5 | 3.1 | 2.2 | 2.4 |

From the results in Table 2, it was apparent that the exoergic filler compositions of the present disclosure have extremely high exoergic property compared with the exoergic filler composition of Comparative Examples containing the same or almost the same volume % of fillers.

Example 7

Epoxy resin (jER 828 manufactured by JAPAN EPOXY RESIN Co., Ltd), curing agent for epoxy resin (jER CURE ST 12 manufactured by JAPAN EPOXY RESIN Co., Ltd), needle-shaped zinc oxide particle a and magnesium oxides having SEM diameter of 10 µm and 1 µm respectively (both were manufactured by Sakai Chemical Industry) were mixed as shown in Table 3, and the obtained mixture was injected into a die with 50 mm×2 mm (diameter x thickness) and heat treated at 80° C. for 3 hours to obtain a molded article. The thermal conductivity of the molded article was measured and the result was shown in Table 3.

Comparative Example 5

Thermal conductivity was measured by following the same procedure as that of Example 7 except that needle-shaped zinc oxide particle a was replaced with the zinc oxide JIS 1 manufactured by Sakai Chemical Industry as shown in Table 3. The result was shown in Table 3.

Comparative Example 6

Thermal conductivity was measured by following the same procedure as that of Example 7 except that the exoergic filler was replaced with alumina 10 µm and 0.8 µm as shown in Table 3. The result was shown in Table 3.

TABLE 3

| | | Example 7 | Comparative Example 5 | Comparative Example 6 |
|---|---|---|---|---|
| Addition amount (weight part) | Epoxy resin | 12 | 12 | 12 |
| | Curing agent for epoxy resin | 6 | 6 | 6 |
| | Needle-shaped zinc oxide particle a | 3.6 | | |
| | Magnesium oxide manufactured by Sakai Chemical Industry (SEM diameter 10 µm) | 10.9 | 10.9 | |
| | Magnesium oxide manufactured by Sakai Chemical Industry (SEM diameter 1 µm) | 4.3 | 4.3 | |
| | Zinc oxide JIS 1 manufactured by Sakai Chemical Industry | | 3.6 | |
| | Alumina 10 µm | | | 14 |
| | Alumina 0.8 µm | | | 6 |
| | Filler (volume %) | 25 | 25 | 25 |
| | Thermal conductivity (W/m · K) | 0.7 | 0.5 | 0.4 |

Example 8

Silicone resin (KE-103 manufactured by Shin-Etsu Chemical Co., Ltd), curing agent for silicone resin (CAT-103 manufactured by Shin-Etsu Chemical Co., Ltd), needle-shaped zinc oxide particle a and two kind of magnesium oxides having SEM diameter of 10 µm and 1 µm (both were manufactured by Sakai Chemical Industry) were mixed as shown in Table 4, and the obtained mixture was pressure molded at 150° C. for 30 minutes to obtain a resin composition. Then, the resin composition was further molded to obtain a molded article with 50 mm×2 mm (diameter x thickness). Thermal conductivity of the molded article was measured and the result was shown in Table 4.

Comparative Example 7

Thermal conductivity was measured by following the same procedure as that of Example 8 except that needle-shaped zinc oxide particle a was replaced with the zinc oxide JIS 1 manufactured by Sakai Chemical Industry as shown in Table 4. The result was shown in Table 4.

Comparative Example 8

Thermal conductivity was measured by following the same procedure as that of Example 8 except that the exoergic filler was replaced with alumina 10 μm and 0.8 μm as shown in Table 4. The result was shown in Table 4.

TABLE 4

|  |  | Example 8 | Compatative Example 7 | Comparative Example 8 |
|---|---|---|---|---|
| Addition amount (weight part) | Silicone resin | 14 | 14 | 14 |
|  | Curing agent for silicone resin | 0.7 | 0.7 | 0.7 |
|  | Needle-shaped zinc oxide particle a | 11.0 |  |  |
|  | Magnesium oxide manufactured by Sakai Chemical Industry (SEM diameter 10 μm) | 32.7 | 32.7 |  |
|  | Magnesium oxide manufactured by Sakai Chemical Industry (SEM diameter 1 μm) | 12.9 | 12.9 |  |
|  | Zinc oxide JIS 1 manufactured by Sakai Chemical Industry |  | 11.0 |  |
|  | Alumina 10 μm |  |  | 42 |
|  | Alumina 0.8 μm |  |  | 18 |
|  | Filler (volume %) | 50 | 50 | 50 |
|  | Thermal conductivity(W/m · K) | 2.9 | 1.8 | 1.6 |

Example 9

Silicone oil (KF-99 manufactured by Shin-Etsu Chemical Co., Ltd), needle-shaped zinc oxide particle a and two kind of magnesium oxides having SEM diameter of 10 μm and 1 μm (both were manufactured by Sakai Chemical Industry) were mixed as shown in Table 5 to obtain an exoergic grease. Thermal conductivity of the exoergic grease was measured and the result was shown in Table 5.

Comparative Example 9

Thermal conductivity was measured by following the same procedure as that of Example 9 except that needle-shaped zinc oxide particle a was replaced with the zinc oxide JIS 1 manufactured by Sakai Chemical Industry as shown in Table 5. The result was shown in Table 5.

Comparative Example 10

Thermal conductivity was measured by following the same procedure as that of Example 9 except that the exoergic filler was replaced with alumina 10 μm and 0.8 μm as shown in Table 5. The result was shown in Table 5.

TABLE 5

|  |  | Example 9 | Comparative Example 9 | Comparative Example 10 |
|---|---|---|---|---|
| Addition amount (weight part) | Silicone oil | 5 | 5 | 5 |
|  | Needle-shaped zinc oxide particle a | 3.6 |  |  |
|  | Magnesium oxide manufactured by Sakai Chemical Industry (SEM diameter 10 μm) | 10.9 | 10.9 |  |
|  | Magnesium oxide manufactured by Sakai Chemical Industry (SEM diameter 1 μm) | 4.3 | 4.3 |  |
|  | Zinc oxide JIS 1 manufactured by Sakai Chemical Industry |  | 3.6 |  |
|  | Alumina 10 μm |  |  | 14 |
|  | Alumina 0.8 μm |  |  | 6 |
|  | Filler (volume %) | 50 | 50 | 50 |
|  | Thermal conductivity (W/m · K) | 2.1 | 1.5 | 1.3 |

Example 10

As shown in Table 6, epoxy resin (jER 828 manufactured by JAPAN EPOXY RESIN Co., Ltd), toluene, needle-shaped zinc oxide particle a and two kind of magnesium oxides having SEM diameter of 10 μm and 1 μm (both were manufactured by Sakai Chemical Industry) were mixed and dispersed by disper to obtain an exoergic coating composition. The thermal conductivity of the exoergic coating composition was measured and the result was shown in Table 6.

Comparative Example 11

Thermal conductivity was measured by following the same procedure as that of Example 10 except that needle-shaped zinc oxide particle a was replaced with the zinc oxide JIS 1 manufactured by Sakai Chemical Industry as shown in Table 6. The result was shown in Table 6.

Comparative Example 12

Thermal conductivity was measured by following the same procedure as that of Example 10 except that the exoergic filler was replaced with alumina 10 μm and 0.8 μm as shown in Table 6. The result was shown in Table 6.

TABLE 6

|  |  | Example 10 | Comparative Example 11 | Comparative Example 12 |
|---|---|---|---|---|
| Addition amount (weight part) | Epoxy resin | 6.3 | 6.3 | 6.3 |
|  | Toluene | 11.7 | 11.7 | 11.7 |
|  | Needle-shaped zinc oxide particle a | 7.2 |  |  |
|  | Magnesium oxide manufactured by Sakai Chemical Industry (SEM diameter 10 μm) | 21.8 | 21.8 |  |
|  | Magnesium oxide manufactured by Sakai Chemical Industry (SEM diameter 1 μm) | 8.6 | 8.6 |  |
|  | Zinc oxide JIS 1 manufactured by Sakai Chemical Industry |  | 7.2 |  |
|  | Alumina 10 μm |  |  | 28 |
|  | Alumina 0.8 μm |  |  | 12 |
|  | Filler (volume %) | 35 | 35 | 35 |
|  | Thermal conductivity (W/m · K) | 1.6 | 1.1 | 1.0 |

Judging from the results shown in Tables 3 to 6, it is apparent that the exoergic filler compositions of the present disclosure have extremely high exoergic property compared with the exoergic filler composition of Comparative Examples containing the same or almost the same volume % of fillers.

INDUSTRIAL APPLICABILITY

The exoergic filler composition of the present disclosure is used suitably as the exoergic filler for a resin composition, an exoergic grease, and an exoergic coating composition.

The invention claimed is:

1. A resin composition comprising a thermoplastic or thermosetting resin and an exoergic filler composition containing:
   (a) 1 to 50 volume % of a needle-shaped zinc oxide having an average long diameter of 0.1 to 10 μm, an average short diameter of 0.025 to 2.5 μm, aspect ratio defined by (average long diameter)/(average short diameter) of 4 or more and specific surface area according to BET method of 50 m$^2$/g or less, and
   (b) 50 to 99 volume % of one or more other exoergic fillers each having a shape and particle size different from the needle-shaped zinc oxide;
   wherein the sum of (a) and (b) totals 100 volume % of the exoergic filler composition; and
   wherein the resin composition contains 30 to 90 volume % of the exoergic filler composition relative to the total solid matter of the composition.

2. The resin composition according to claim 1, wherein the one or more other exoergic fillers comprises at least one selected from the group consisting of zinc oxide, alumina, boron nitride, aluminum nitride, and magnesium oxide.

3. A coating composition comprising the resin composition according to claim 2.

4. The resin composition according to claim 2, wherein the thermoplastic or thermosetting resin is at least one member selected from the group consisting of epoxy resins, phenol resins, polyphenylene sulfide resins (PPS), polyester resins, polyamides, polyimides, polystyrenes, polyethylenes, polypropylenes, polyvinyl chlorides, polyvinylidene chlorides, fluorine resins, polymethyl methacrylate, ethylene/ethyl acrylate copolymer resin (EEA), polycarbonates, polyurethanes, polyacetals, polyphenylene ethers, polyether imides, acrylic nitrile-butadiene-styrene copolymer resin (ABS), liquid crystal resins (LCP), silicone resins and acrylic resins.

5. The resin composition according to claim 2, wherein the thermoplastic or thermosetting resin comprises ethylene/ethyl acrylate copolymer resin (EEA).

6. A coating composition comprising the resin composition according to claim 1.

7. The resin composition according to claim 1, wherein the thermoplastic or thermosetting resin is at least one member selected from the group consisting of epoxy resins, phenol resins, polyphenylene sulfide resins (PPS), polyester resins, polyamides, polyimides, polystyrenes, polyethylenes, polypropylenes, polyvinyl chlorides, polyvinylidene chlorides, fluorine resins, polymethyl methacrylate, ethylene/ethyl acrylate copolymer resin (EEA), polycarbonates, polyurethanes, polyacetals, polyphenylene ethers, polyether imides, acrylic nitrile-butadiene-styrene copolymer resin (ABS), liquid crystal resins (LCP), silicone resins and acrylic resins.

8. The resin composition according to claim 1, wherein the thermoplastic or thermosetting resin comprises ethylene/ethyl acrylate copolymer resin (EEA).

* * * * *